US011354491B1

(12) United States Patent
Wade et al.

(10) Patent No.: US 11,354,491 B1
(45) Date of Patent: Jun. 7, 2022

(54) SYSTEMS AND METHODS FOR IMPROVED DATA MODELING AND TRANSLATION

(71) Applicant: Itential, Inc., Atlanta, GA (US)

(72) Inventors: Christopher Allen Wade, Atlanta, GA (US); Michael Gettys Wymer, Roswell, GA (US)

(73) Assignee: Itential, Inc., Atlanta, GA (US)

( * ) Notice: Subject to any disclaimer, the term of this patent is extended or adjusted under 35 U.S.C. 154(b) by 0 days.

(21) Appl. No.: 16/723,231

(22) Filed: Dec. 20, 2019

(51) Int. Cl.
*G06F 40/174* (2020.01)
*G06F 40/143* (2020.01)
*G06F 16/958* (2019.01)
*G06F 16/25* (2019.01)

(52) U.S. Cl.
CPC .......... *G06F 40/174* (2020.01); *G06F 16/258* (2019.01); *G06F 16/986* (2019.01); *G06F 40/143* (2020.01)

(58) Field of Classification Search
CPC .... G06F 40/174; G06F 16/986; G06F 16/258; G06F 40/143
USPC .......................................................... 715/222
See application file for complete search history.

(56) References Cited

U.S. PATENT DOCUMENTS

| | | | | |
|---|---|---|---|---|
| 9,294,340 B1* | 3/2016 | Logue | ..................... | H04L 67/10 |
| 9,547,532 B2* | 1/2017 | Loughry | ................. | G06F 9/541 |
| 9,621,428 B1* | 4/2017 | Lev | ........................ | H04L 41/12 |
| 2008/0010629 A1* | 1/2008 | Berg | ..................... | G06F 40/221 |
| | | | | 717/116 |
| 2016/0212227 A1* | 7/2016 | Berarducci | ............. | H04L 67/16 |
| 2017/0270157 A1* | 9/2017 | Porika | ................... | G06F 16/955 |
| 2019/0020544 A1* | 1/2019 | Kristjansson | ........... | H04L 41/22 |
| 2019/0036972 A1* | 1/2019 | Inoue | ...................... | H04L 63/10 |
| 2019/0296982 A1* | 9/2019 | Clark | ...................... | H04L 67/12 |
| 2020/0073971 A1* | 3/2020 | Elliott | ................... | G06F 16/211 |

* cited by examiner

*Primary Examiner* — Stephen S Hong
*Assistant Examiner* — Broderick C Anderson
(74) *Attorney, Agent, or Firm* — Morris, Manning & Martin, LLP; Daniel E. Sineway, Esq.; Daniel T. Begasse

(57) ABSTRACT

Systems and methods are disclosed for improving data modeling and translating. The system receives network-related data from external systems, wherein the data is formatted in various modeling languages corresponding to the system or network components from which it is transmitted. The system parses and extracts the network-related data for identifying parameters within the data, wherein the parameters correspond to the system or network component's operational status. The system translates the extracted data to a human-readable format for displaying the data to a system user and allowing the user to modify or provide additional parameters. The system generates a new instance of the network-related data including the user-provided parameters, wherein the new instance is translated into a format in accordance with the modeling language of the initially received network-related data.

22 Claims, 9 Drawing Sheets

SYSTEMS AND METHODS FOR IMPROVED DATA MODELING AND TRANSLATION

TECHNICAL FIELD

The present systems and methods relate generally to improved data modeling and translation techniques, and more particularly to translating instances of data models received from network components and formatted according to various modeling languages into an agnostic model format for generating new instances of the data models for modifying or augmenting to the network components from which the original data models were received.

BACKGROUND

Modern computing networks generally include various hardware and software components included within the network, where each component contributes to the network's overall operability, performance, and functionality. These various hardware and software components generally communicate throughout the network via application programming interfaces (APIs) and configuration protocols such as NETCONF. Certain modeling languages, such as YANG and TOSCA, allow for users or administrators of the network to monitor the status and state of the various hardware and software components, according to protocols such as NETCONF, in a human-readable fashion. However, conventional compilers for these modeling languages and network protocols cannot operate at runtime without sacrificing or excluding data valuable to a network administrator or user. Furthermore, while network users or administrators may monitor the status and state of various network components via receiving APIs from the components, the users or administrators may not easily modify the network components using the information included in the API call.

Therefore, there exists a long-felt but unresolved need for systems and methods for translating between network modeling languages to allow for network administrators and users to access the entirety of data available via network protocols, and furthermore for translating network data formatted according to various modeling languages for generating user-modified data model instances.

BRIEF SUMMARY OF DISCLOSURE

The present systems and methods relate generally to improved data modeling and translating techniques, and more particularly to translating various data models into a uniform model for modifying instances of those network components. Typical computer networks include a plurality of components such as servers, routers, switches, edge devices, etc. Accordingly, each component in a computer network may transmit and receive data according to a unique standard, format, or API. For example, a router manufactured by Cisco Systems and a router manufactured by Nokia Networks may both be manufactured to route internet traffic; however, each router may be configured with unique requirements for receiving and transmitting the internet traffic (e.g., each router operates according to different and unique APIs). The implementation of different and unique APIs for each component in a network requires conventional networks to be manually configured, including manually linking the components to the appropriate destination(s) or application(s) they service. The manual configuration of the APIs and the applications they service is a cumbersome process, inefficient for network traffic, and generally exposes the functionality of the components to network vulnerabilities and failures. The present systems and methods aim to solve this problem with a technical solution including an API integration module operable to detect active components or devices in a computer network, determine the APIs used by each detected component or device, generate a federated API to be used for intra-network communications, thereby reducing the need for each network component to be reliant on its own API. Particular embodiments of the present disclosure allow for API calls formatted according to various network modeling languages (or modeled according to the federated API) to furthermore be represented as a human-readable and human-modifiable message, form, or template for configuring/managing the network components corresponding to the API calls.

According to various aspects of the present disclosure, the system disclosed herein includes a combination of hardware and software configured to detect components in a computer network. Referring to the example above, consider a computer network including one Cisco Systems router and one Nokia Networks router. In one embodiment, the present system is configured to ingest the APIs from each of these components and use the ingested APIs to generate a language-agnostic (e.g., JSON) representation of the ingested API. Within the system, API messages from both the Cisco Systems router and the Nokia router will be converted to the language-agnostic format until the API messages are received at their respective destinations, where they are converted back to the particular required API format. The systems and methods described herein allow for a computer network to improve reliability, increase scalability, and also generally maximize overall network performance.

Furthermore, embodiments of the present disclosure allow for language-agnostic instances of network components to be generated and modified based on a normalized and federated API. In particular embodiments, the language-agnostic instances of network components are based on API calls received from the network components, or from data models such as those represented in the YANG modeling language, where these received API calls and YANG models are first converted into the federated API format.

Moreover, additional aspects of the present disclosure allow for network data (received/detected via API calls, or the like) to be translated from its native modeling language format (e.g., YANG, TOSCA, NEMO, etc.) to a human-readable and agnostic format (e.g., JSON), from which the system may generate a form or template including parameters extracted from the network data. In various embodiments, users or administrators of the system may use a GUI, manually editable text, or other input means, to interact with the generated form/template for adjusting (or augmenting to) the extracted parameters. For example, a system user may increase the bandwidth limit of the particular network component from which the network data was received. In other embodiments, the network data may include all of the parameters detailing a particular virtual computing machine included in an external system, and from this network data embodiments of the system described in the present disclosure may generate a form or template allowing for a system user to instantiate a new virtual computing machine with the same, or adjusted, parameters.

In one embodiment, the present disclosure discusses a computer-implemented method for translating network component model data, the method comprising the steps of: receiving model data from a particular network component associated with an external system, wherein the model data comprises a particular data format defined by the particular network component, and wherein the model data comprises a plurality of parameters relating to the particular network component; translating the model data to a language-agnostic data format; generating a web-based form based on the language-agnostic data format, wherein the web-based form comprises text fields corresponding to the plurality of parameters relating to the particular network component; receiving instance parameters based on user-provided input in the form; generating a data payload comprising the instance parameters, wherein the data payload is compiled in a format based on the particular data format corresponding to the model data; and transmitting the data payload to the particular network component.

In various embodiments, the external system comprises a plurality of servers, modems, and switches. In a particular embodiment, the model data comprises data formatted according to the JSON modeling language. In certain embodiments, the external system comprises a network orchestrator. In at least one embodiment, the model data comprises data formatted according to the YANG modeling language. In some embodiments, the external system comprises a cloud orchestrator. According to various aspects of the present disclosure, the model data comprises data formatted according to the TOSCA modeling language.

In one embodiment, the model data is originally directed to a particular network application operable to execute instructions received in the particular data format. In a particular embodiment, the language-agnostic data format is JSON. In certain embodiments, the parameters corresponding to the particular network component comprises a component identifier, a bandwidth reading, a throughput readings, a data packet loss reading, and/or a latency reading.

In at least one embodiment, prior to translating the model data, the method further comprises the steps of: parsing the model data for one or more predetermined terms indicative of the parameters corresponding to the particular network component; and extracting the one or more predetermined terms and the corresponding parameters, wherein the extracted one or more predetermined terms and corresponding parameters are mapped to the language-agnostic data format based on a particular mapping policy.

In certain embodiments, the web-based form is an HTML form, and wherein a user provides the instance parameters via a GUI representation of the HTML form or a text representation of the HTML form.

In one embodiment, the present disclosure further discusses a system for translating network component model data, comprising: a processor operatively connected to a plurality of network components and network applications, wherein the processor facilitates electronic communications between the network components and the network applications by executing the steps comprising: receiving model data from a particular network component associated with an external system, wherein the model data comprises a particular data format defined by the particular network component, and wherein the model data comprises a plurality of parameters relating to the particular network component; translating the model data to a language-agnostic data format; generating a web-based form based on the language-agnostic data format, wherein the web-based form comprises text fields corresponding to the plurality of parameters relating to the particular network component; receiving instance parameters based on user-provided input in the form; generating a data payload comprising the instance parameters, wherein the data payload is compiled in a format based on the particular data format corresponding to the model data; and transmitting the data payload to the particular network component.

In various embodiments, the external system comprises a plurality of servers, modems, and switches. In a particular embodiment, the model data comprises data formatted according to the JSON modeling language. In certain embodiments, the external system comprises a network orchestrator. In at least one embodiment, the model data comprises data formatted according to the YANG modeling language. In some embodiments, the external system comprises a cloud orchestrator. According to various aspects of the present disclosure, the model data comprises data formatted according to the TOSCA modeling language.

In one embodiment, the model data is originally directed to a particular network application operable to execute instructions received in the particular data format. In a particular embodiment, the language-agnostic data format is JSON. In certain embodiments, the parameters corresponding to the particular network component comprises a component identifier, a bandwidth reading, a throughput readings, a data packet loss reading, and/or a latency reading.

In at least one embodiment, prior to translating the model data, the processor further executes the step comprising: parsing the model data for one or more predetermined terms indicative of the parameters corresponding to the particular network component; and extracting the one or more predetermined terms and the corresponding parameters, wherein the extracted one or more predetermined terms and corresponding parameters are mapped to the language-agnostic data format based on a particular mapping policy.

In certain embodiments, the web-based form is an HTML form, and wherein a user provides the instance parameters via a GUI representation of the HTML form or a text representation of the HTML form.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF DISCLOSURE

Figure 1:
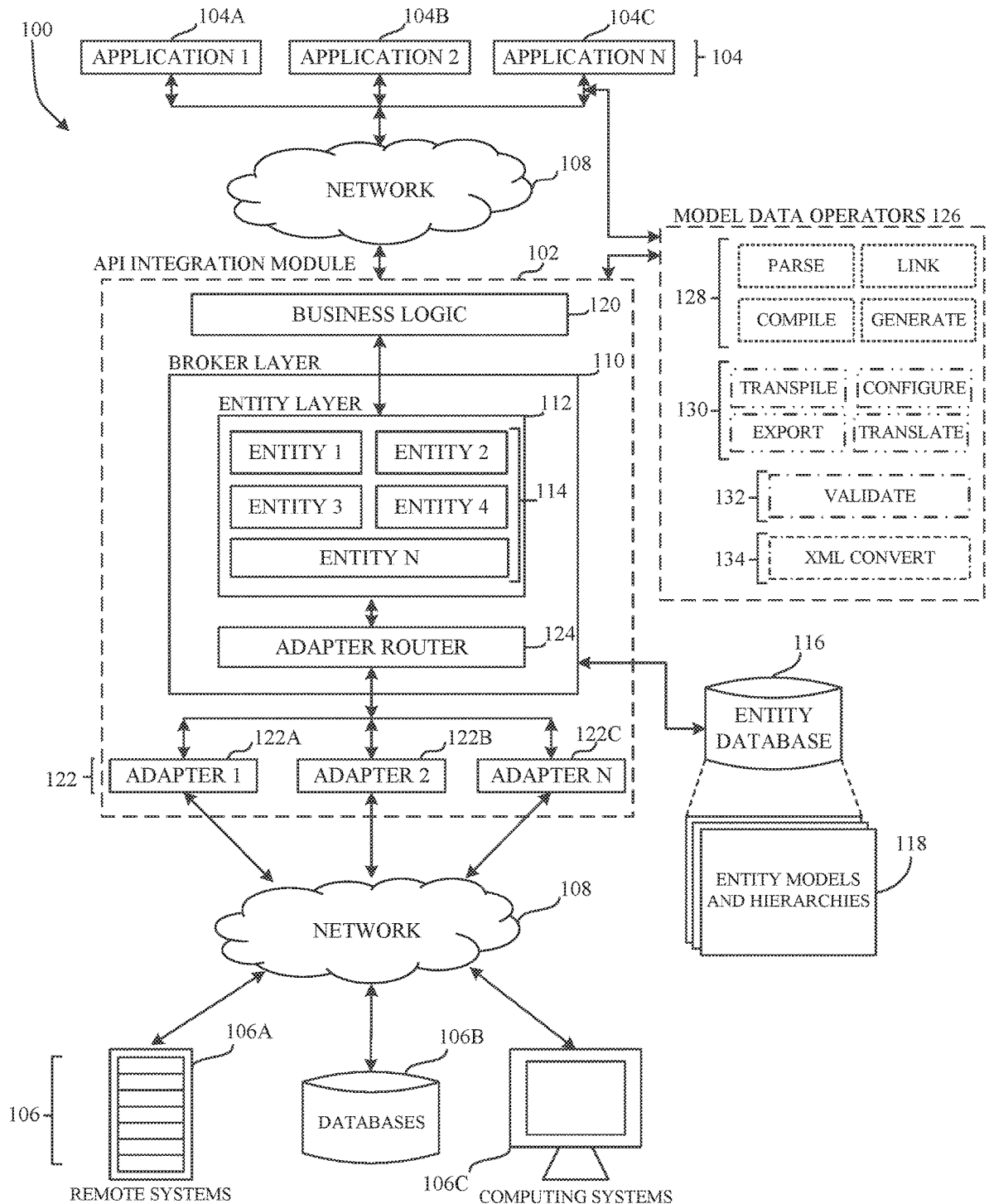
FIG. 1 is an exemplary system diagram, according to one aspect of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure relate generally to improved data modeling and translation techniques, and more particularly to translating various data models into a uniform model for modifying instances of those network components. Typical computer networks include a plurality of components such as servers, routers, switches, edge devices, etc. Accordingly, each component in a computer network may transmit and receive data according to a unique standard, format, or API. For example, a router manufactured by Cisco Systems and a router manufactured by Nokia Networks may both be manufactured to route internet traffic; however, each router may be configured with unique requirements for receiving and transmitting the internet traffic (e.g., each router operates according to different and unique APIs). The implementation of different and unique APIs for each component in a network requires conventional networks to be manually configured, including manually linking the components to the appropriate destination(s) or application(s) they service. The manual configuration of the APIs and the applications they service is a cumbersome process, inefficient for network traffic, and generally exposes the functionality of the components to network vulnerabilities and failures. The present systems and methods aim to solve this problem with a technical solution including an API integration module operable to detect active components or devices in a computer network, determine the APIs used by each detected component or device, generate a federated API to be used for intra-network communications, thereby reducing the need for each network component to be reliant on its own API. Particular embodiments of the present disclosure allow for API calls formatted according to various network modeling languages (or modeled according to the federated API) to furthermore be represented as a human-readable and human-modifiable message, form, or template for configuring/managing the network components corresponding to the API calls.

According to various aspects of the present disclosure, the system disclosed herein includes a combination of hardware and software configured to detect components in a computer network. Referring to the example above, consider a computer network including one Cisco Systems router and one Nokia Networks router. In one embodiment, the present system is configured to ingest the APIs from each of these components and use the ingested APIs to generate a language-agnostic (e.g., JSON) representation of the ingested API. Within the system, API messages from both the Cisco Systems router and the Nokia router will be converted to the language-agnostic format until the API messages are received at their respective destinations, where they are converted back to the particular required API format. The systems and methods described herein allow for a computer network to improve reliability, increase scalability, and also generally maximize overall network performance.

Furthermore, embodiments of the present disclosure allow for language-agnostic instances of network components to be generated and modified based on a normalized and federated API. In particular embodiments, the language-agnostic instances of network components are based on API calls received from the network components, or from data models such as those represented in the YANG modeling language, where these received API calls and YANG models are first converted into the federated API format.

Moreover, additional aspects of the present disclosure allow for network data (received/detected via API calls, or the like) to be translated from its native modeling language format (e.g., YANG, TOSCA, NEMO, etc.) to a human-readable and agnostic format (e.g., JSON), from which the system may generate a form or template including parameters extracted from the network data. In various embodiments, users or administrators of the system may use a GUI, manually editable text, or other input means, to interact with the generated form/template for adjusting (or augmenting to) the extracted parameters. For example, a system user may increase the bandwidth limit of the particular network component from which the network data was received. In other embodiments, the network data may include all of the parameters detailing a particular virtual computing machine included in an external system, and from this network data embodiments of the system described in the present disclosure may generate a form or template allowing for a system user to instantiate a new virtual computing machine with the same, or adjusted, parameters.

Referring now to the drawings, FIG. 1 illustrates a diagram of the exemplary system 100, according to one aspect of the present disclosure. As shown in the present embodiment, the disclosed system may be integrated into a computing network at a business or other organization for supporting business-wide emails, telecommunications, integration with various applications, etc. As will be discussed in greater detail herein, the disclosed system allows for a plurality of components in a computing network, that each may communicate via unique APIs, to transmit and receive communications and data through the system described herein by means of a federated, or system-universal, API. According to various embodiments of the present disclosure, the exemplary system 100 implements a model-based programming approach to provide a common framework, schema, or federated API, for system-wide communication. Accordingly, embodiments of the disclosed system may be provided via a SaaS package, a combination of hardware and software, a web-based network solution, etc. In particular embodiments, the entire system 100 may operate locally to the hosting organization's computing network, remote to the computing network, or various components of the disclosed system may operate divided between the remote and local environment. In certain embodiments, the system 100 may enable "plug-and-play" functionality within a computer network. In one embodiment, the plug-and-play functionality allows for components to be added, removed, or swapped without the need to configure or reconfigure the components. As is mentioned above, in conventional networks configuring components often includes manually linking the components and their APIs to the applications they service, which is a cumbersome task. Conventional networks may also require a temporary shut down or general offline status when registering, adding, removing, or swapping network components. The system 100 described herein, and the plug-and-play functionality it provides, solves this issue by generating a federated API based on the one or more unique APIs detected within the computer network, and further dynamically extending the API functionality in response to changes in the network components.

In one embodiment, the system 100 includes an API integration module 102 central to the system 100. In particular embodiments, the API integration module 102 is a software configuration installed on one or more servers or nodes in the computing network of the system 100 for ingesting APIs and creating federated APIs. As mentioned above, the API integration module 102 allows for one or more components that typically communicate with applications via unique APIs to transmit data, request data, and receive data, according to a federated API that is independent of the unique APIs generally required for such communication.

As shown in the present embodiment, the API integration module 102 is operatively connected to one or more applications 104 (independently labeled 104A, 104B, and 104N), as well as one or more components 106 (e.g., remote systems 106A, databases 106B, computing systems 106C, "virtual" devices, etc.) over a communications network 108. In one embodiment, the one or more applications 104 may be applications such as mobile applications, web servers, or any other types of computer aided applications that transmit and receive electronic communications via an API. For example, consider that application 104A is a social media application (e.g., Twitter). In various embodiments, the application 104A may send API calls, such as data requests, to the remote systems 106A for data relating to a particular trending topic to be displayed to a user. According to various aspects of the present disclosure, the API call from the application 104A is converted or transformed at the API integration module 102 into a language-agnostic representation of the API call based at least in part on the determined recipient of the API call.

In one embodiment, the network 108 may be, but is not limited to, the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

In various embodiments, the API integration module 102 encompasses various software layers and modules, such as a broker layer 110 for maintaining the language-agnostic representations of one or more ingested APIs. In a particular embodiment, the broker layer 110 may encompass various software layers and modules of its own, such as the entity layer 112. According to various aspects of the present disclosure, the language-agnostic representations of the one or more ingested APIs are shown in the present embodiment within the entity layer 112 and referred to herein as entities 114. In one embodiment, one or more entities 114 are preconfigured software objects, or models, that may be uniquely instantiated to represent particular devices, service models, topologies, etc., based on their APIs. In particular embodiments, models or frameworks of the one or more entities 114 may be stored locally within the API integration module 102 or in an entity database 116. In some embodiments, the entity database may be included in the API integration module 102, or the entity database 116 may be separate (e.g., remote) from the API integration module 102. According to various aspects of the present disclosure, the entity database 116 includes entity models and hierarchies 118 for instantiating entities 114 based on the detected components and devices within the system 100, and their corresponding APIs. The entity models and hierarchies 118 will be discussed further below in the description of FIG. 2.

Continuing with FIG. 1, and according to one embodiment, the API integration module 102 may also include a business logic module 120, one or more adapters 122, and an adapter router 124. According to various aspects of the present disclosure, the business logic module 120, the one or more adapters 122, and the adapter router 124, generally function near the edge of the API integration module 102, meaning that the modules are configured to intercept, convert, and route API calls received from the one or more applications 104 or the one or more components 106. According to various aspects of the present disclosure, the business logic module 120 is operatively connected to the entity layer 112 and is configured to receive API calls from the one or more applications 104 over the network 108. In certain embodiments, and in response to receiving an API call from the one or more applications 104, the business logic module 120 may determine the type of API call received and further transform the received API call into a language-agnostic representation of the API call. As will be discussed in greater detail below in the description of FIG. 4, in response to transforming the received API call into a language-agnostic representation of the API call, the language-agnostic message is routed to an adapter.

In one embodiment, the one or more adapters 122 are software modules configured to operatively connect to the one or more components 106. In some embodiments, the operative relationship between the one or more adapters 122 and the one or more components 106 is analogous to a port (adapter 122) for accepting a corresponding plug (component 106). According to various aspects of the present disclosure, the one or more adapters 122 may be component-specific, or may be operable to accept a plurality of components 106, and the one or more adapters 122 are configured to serve as a gateway between the API integration module 102 and the one or more components 106. In a particular embodiment, an API call from an application 104 with the destination of the database 106B will first be routed to the particular adapter 122 that corresponds to the database 106B. Furthermore, and according to certain embodiments, the adapter 122 may convert the API call from the language-agnostic representation to the unique API format of the database 106B prior to routing the API call.

In various embodiments, the adapter router 124 included within the broker layer 110 is configured to determine which of the one or more adapters may receive a particular language-agnostic API call. In one embodiment, during the adapter registration process, which will be described in greater detail below in the discussion of FIG. 3, the one or more adapters 122 are mapped (e.g., via unique identifiers) to the one or more instantiated entities 114 for API routing.

Continuing with FIG. 1, the system 100 includes various modules or operators for converting a received/intercepted data model (e.g., a YANG representation of a network component or API call) into a lossless format that is easily usable within the system 100 and allows for a user of the system 100 to modify the lossless format and furthermore re-convert the data from the lossless format into a format acceptable to be received by the network components (e.g., NETCONF/YANG). In the present embodiment, these various modules are labeled as model data operators 126, and the model data operators 126 include a plurality of individual operators for modifying, processing, or translating model data within the system, and furthermore generating new instances of the model data. As indicated by varying hatching styles shown around the individual operators, each operator may be supported/executed by a particular processor within the system 100 or API integration module 102, or each of the similarly hatched operators may correspond to a particular data class. For example, the dotted hashed operators/modules 128 including the parse, compile, link, and generate operators may all execute via the same flow of execution or via the same processing tool/resource. In particular embodiments, the operators/modules 130 (transpile, configure, export, translate), the validate operator 132, and the XML convert operator 134, each also correspond to a separate processing tools and/or resources. According to various aspects of the present disclosure, these operators allow for the execution of the processes described herein, particularly the processes described in association with FIGS. 5-9.

Figure 2:
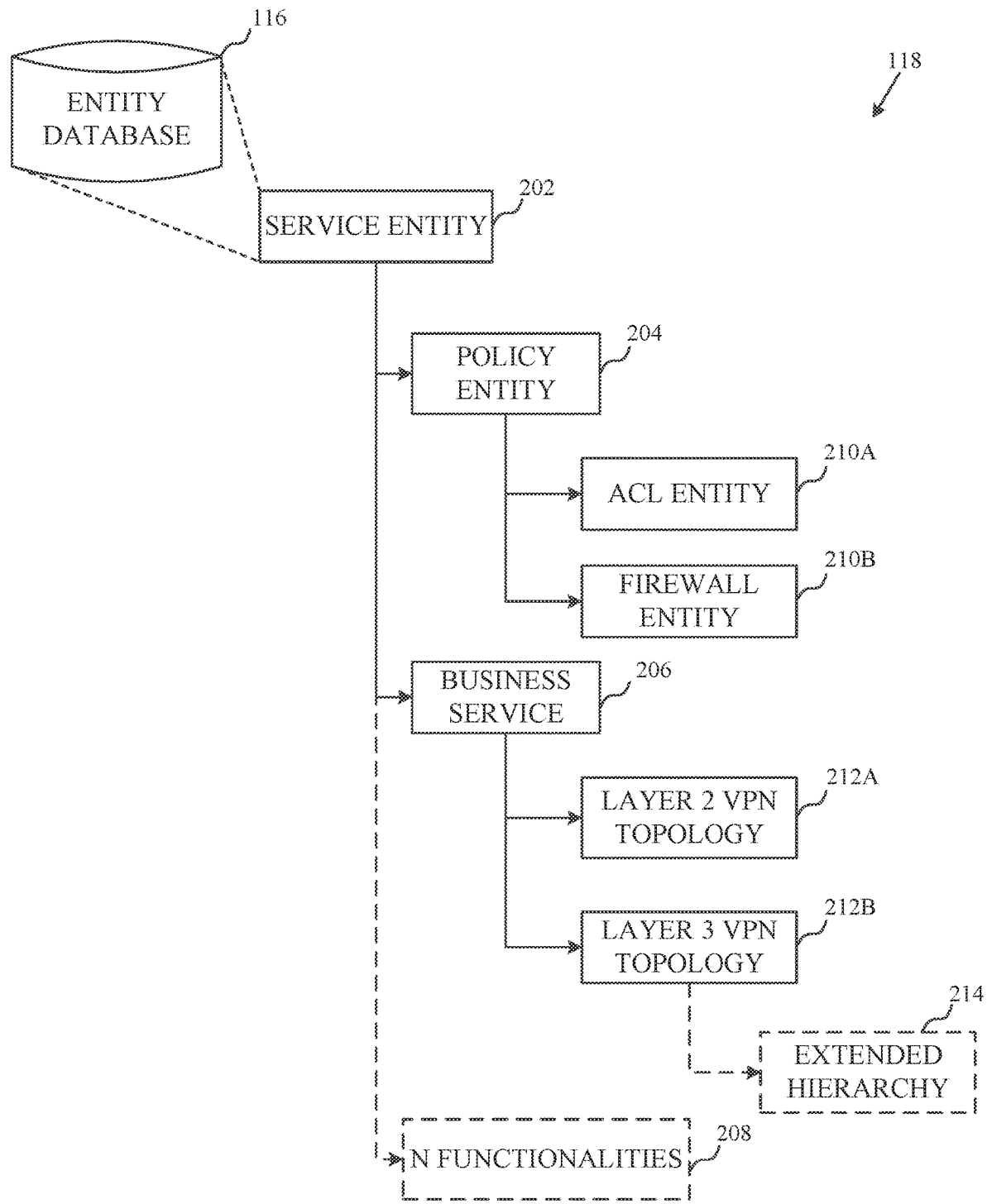
FIG. 2 illustrates an exemplary entity hierarchy structure, according to one aspect of the present disclosure.

FIG. 2 illustrates an exemplary entity hierarchy structure (e.g., entity models and hierarchies 118), according to one embodiment of the present disclosure. In various embodiments, and mentioned in the discussion of FIG. 1 above, the entity database 116 may include entity models and hierarchies 118 for instantiating the one or more entities 114. In one embodiment, entities 114 are preconfigured software objects, or models, that may be uniquely instantiated to represent particular devices (physical and virtual), service models, topologies, network components, etc., based on their APIs. In other words, entity models and hierarchies 118 are potential blueprints that define the downstream functionality available to entities 114 and how entities 114 may be instantiated.

As shown in the present embodiment, a model and hierarchy 118 for an exemplary service entity 202 is included within the entity database 116 (indicated by the dashed lines), according to one aspect of the present disclosure. It should be understood that the use of a service entity in the present embodiment is exemplary, non-limiting, and for illustrative purposes only, and any other entity model (e.g., device, topology, user, etc.) can be appropriately substituted. In various embodiments, a service entity 202 may encompass API functionality (e.g., various tiers and layers of functionality) for software applications, SaaS products, etc. As shown in the present embodiment, an instantiated service entity 202 may include or inherit a policy entity 204 and business services 206, as defined by the service entity 202 hierarchy. Also shown in the present embodiment is the service entity 202 including "N functionalities" 208, which may allow for the functionality of the service entity 202 to be extended to support various applications 104 and components 106 not currently supported, if necessary, which will be described in further detail in the discussion of FIG. 3. Continuing with the description of FIG. 2, and looking further down the policy entity 204 branch, is both an ACL (Access Control List) entity 210A and a firewall entity 210B. According to various aspects of the present disclosure, both the ACL entity 210A and the firewall entity 210B are inherited when a service entity is instantiated, and including both the ACL entity 210A and firewall entity 210B provides the system with additional security functionality offered by ACLs and firewalls, such as controlling network traffic.

In one embodiment, and for illustrative purposes only, extending from the business services 206 branch is a Layer 2 VPN (virtual private network) topology 212A as well as a Layer 3 VPN topology 212B. According to various aspects of the present disclosure, inheriting both the Layer 2 VPN topology 212A and the Layer 3 VPN topology 212B allows for the service entity to include both sets of functionality when managing VPNs. Furthermore, and according to a particular embodiment, the functionality of the Layer 3 VPN topology 212B can be extended (see extended hierarchy 214) to include additional aspects that may not be available in the already included Layer 3 VPN topology 212B, such as specific routing rules.

According to various aspects of the present disclosure, the extendable hierarchy structure shown in the present embodiment allows for the system 100 to operate dynamically and with flexibility. Moreover, and according to one embodiment, this hierarchical structure makes it possible so that if a new component 106, that is similar in most ways but still different than a preexisting component with an already instantiated entity 114, is detected within the system 100, the system 100 may extend the entity model (see 214) relating to the previously instantiated entity 114 to support the new component. In some embodiments, a virtually infinite number of extensions may be augmented to an entity model to support various detected network components, as appropriate.

Figure 3:
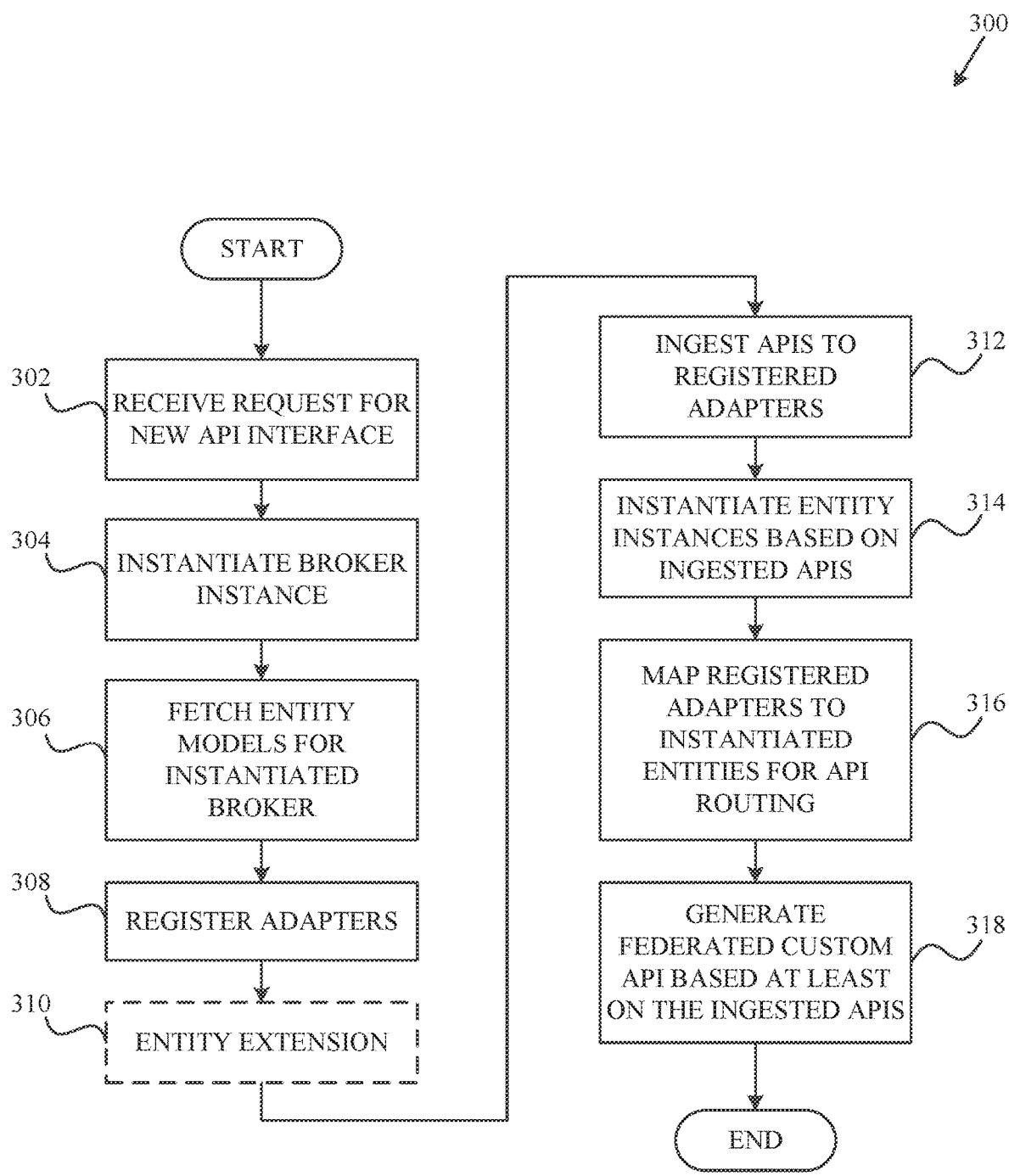
FIG. 3 is an exemplary federated API generation process, according to one aspect of the present disclosure.

Looking now at FIG. 3, a flowchart of the exemplary federated API generation process 300 is shown, according to one aspect of the present disclosure. In various embodiments, the federated API generation process 300 generally includes instantiating and configuring the broker layer 110, and other components included in the API integration module 102, for ingesting APIs from the one or more components 106. Furthermore, and in particular embodiments, entity instances 114 are instantiated based on the registered adapters 122 and the APIs they ingest. In certain embodiments, the entity instances 114 are mapped to the registered adapters 122 for routing received API calls (at the business logic module 120) according to a federated API. These and other aspects of the exemplary federated API generation process 300 will be described in greater detail below.

In one embodiment, the federated API generation process 300 begins at step 302, when a request is received for a new API interface, or a federated API. In various embodiments, the request for a new API interface is received at the API integration module 102 and may be requested by the one or more components 106, the one or more applications 104, an administrator of the system 100, etc. In a particular embodiment, a request for a new API interface initiates within the system 100 API support for a new component (e.g., a remote system 106) so that communications to and from that new component can be included in and supported by the federated API.

At step 304, and in response to receiving a request for a new API interface, an instance of the broker layer 110, or "broker instance", is instantiated, according to one embodiment. Mentioned previously in the discussion of FIG. 1, and according to one embodiment, the broker layer 110 is a software layer for managing the direction and flow of federated API calls within the system 100. In a particular embodiment, the broker layer includes one or more entities 114 in an entity layer 112, each entity 114 configured to map to at least one of the one or more components 106 via an adapter 122. In some embodiments, instantiating the broker instance 110 may include executing a set of computer-executable instructions for generating a particular instance of a broker model. In certain embodiments, the model for a broker layer 110 may be preconfigured to expect the later instantiation of particular entities 114.

According to various aspects of the present disclosure, at step 306, entity models are fetched for populating the instantiated broker layer 110. In one embodiment, the entity models are frameworks for the one or more entities 114, and fetching entity models at step 306 allows for the one or more entities 114 to be instantiated later during the process 300. In a particular embodiment, the fetched entity models may be a preconfigured set of possible entity models (e.g., all available entity models), or the fetched entity models may correspond to a specific or customized set of entity models for supporting particular components 106 (e.g., only entity models for certain devices and service models).

At step 308, and in one embodiment, the adapters 122 included in the API integration module 102 are registered. Referring back to the discussion of FIG. 1, one or more adapters 122 are included within the API integration module 102, the one or more adapters 122 serving as a gateway or point of communication between the one or more components 106 and the API integration module 102. In a particular embodiment, the one or more adapters 122 are each associated with at least one of the one or more components 106 for receiving and transmitting electronic communications, such as API calls, to and from the one or more components 106. For example, a particular adapter 122 included in the one or more adapters 122 (e.g., Adapter 1, as shown in FIG. 1) may be configured to receive and transmit API calls to and from a particular router manufactured by Nokia. In various embodiments, the registration of the adapters at step 308 includes determining the one or more components, such as the router manufactured by Nokia, that are present within the computer network and to further configure the adapters for receiving API calls from those types of components 106.

In a certain embodiments, an optional step in the federated API generation process 300 is step 310, in which entities are "extended" to include additional functionalities corresponding to the underlying components that they represent. In one embodiment, entity extension allows for the entity models to be augmented to in response to an API call or detected component 106 that is not supported by the current entity models. For example, and referring back to the embodiment shown in FIG. 2, the model for a service entity 202 may include a policy entity component 204 as well as business services 208 including Layer 2 VPN topology 210A and Layer 3 VPN topology 210B. According to various aspects of the present disclosure, if a service entity were instantiated according to the above described framework hierarchy, each of the aspects of the hierarchy would be inherited. However, and according to various embodiments, if it is determined that a particular component may require additional support or functionality from an entity model, the model may be augmented to, or extended, as illustrated in the extended hierarchy 214 in FIG. 2. In one embodiment, the extended entity model may be an entirely new and separate entity model from the previously fetched models, and the extension may allow for additional services and topologies to be included in the entity model, as well as allow further the entities 114 to be instantiated from the new model. In some embodiments, the preexisting entities may be extended instead of generating a new entity model.

In a particular embodiment, at step 312, the APIs from the one or more components 106 are ingested via the registered adapters 122. In one embodiment, API ingestion includes accepting or receiving one or more API function calls from the one or more components 106 for analyzing particular aspects of the API calls. For example, API ingestion at an adapter 122 operatively connected to a server (e.g., remote system 106A) may determine information from a server API call indicating that the API call typically includes one or more destination IP addresses, commands for reading or writing data, particular MAC addresses, etc., and generally that the API call is a "server API call." According to various aspects of the present disclosure, the one or more adapters may ingest the one or more API function calls and further generate a language-agnostic (e.g., JSON) representation of the API call. In a particular embodiment, the language-agnostic representation of the API call is a schema for how an entity should be instantiated in order to support the component 106 corresponding to the API call. In some embodiments, the system may generate a language-agnostic representation of an API call in a format that is similar to JSON, but aspects of the format may be customized or extended to provide capabilities not available in traditional JSON.

According to various aspects of the present disclosure, at step 314, one or more entity instances 114 are instantiated based on at least the APIs ingested at step 312. In one embodiment, the language-agnostic representations of the ingested APIs generated at step 312 may include parameters for instantiating the one or more entity instances 114. For example, a language-agnostic representation of an API call from a component 106 may include information such as IP addresses, data packet destinations, MAC addresses, etc. Accordingly, and according to one embodiment, a "device entity" may be instantiated with the particular parameters of the generated schema to support API calls from the particular component. In various embodiments, various types of entities may be instantiated such as device entities, service model entities, user entities, topology entities, etc. In a particular embodiment, entities are instantiated with particular parameters to represent, for example, the one or more components 106 corresponding to APIs ingested from the one or more components 106.

In one embodiment, at step 316 the registered adapters are mapped to the instantiated entities for API routing. In various embodiments, adapter mapping includes configuring the adapter router 124 for directing various API calls between the one or more components 106 and the broker layer 110. In certain embodiments, each adapter 122 includes instructions for routing API calls to the broker layer 110 via the adapter router 124 based in part on the particular APIs corresponding to the one or more components 106.

Proceeding to step 318, a federated custom API is generated based at least on the ingested APIs. According to various embodiments, the federated API is a system-universal API that encompasses and supports each individual API ingested at the one or more adapters 122. In one embodiment, the federated API may allow for the components and modules included in the system 100 to communicate according to one API, rather than each component or module requiring a unique API. For example, the federated API may allow for an API call from a router that typically includes a unique format to be represented and transmitted within the system 100 in a universal format understood by each module of the system 100 (e.g., the federated API indicates the action the API call is requesting, and its corresponding entity 114). In various embodiments, the federated API format may be used to communicate API calls within the system 100, but when federated API calls are received at either the business logic module 120 or the one or more adapters 122, the federated API format may be translated or transformed into the particular unique API format of the intended destination application 104 or component 106.

Figure 4:
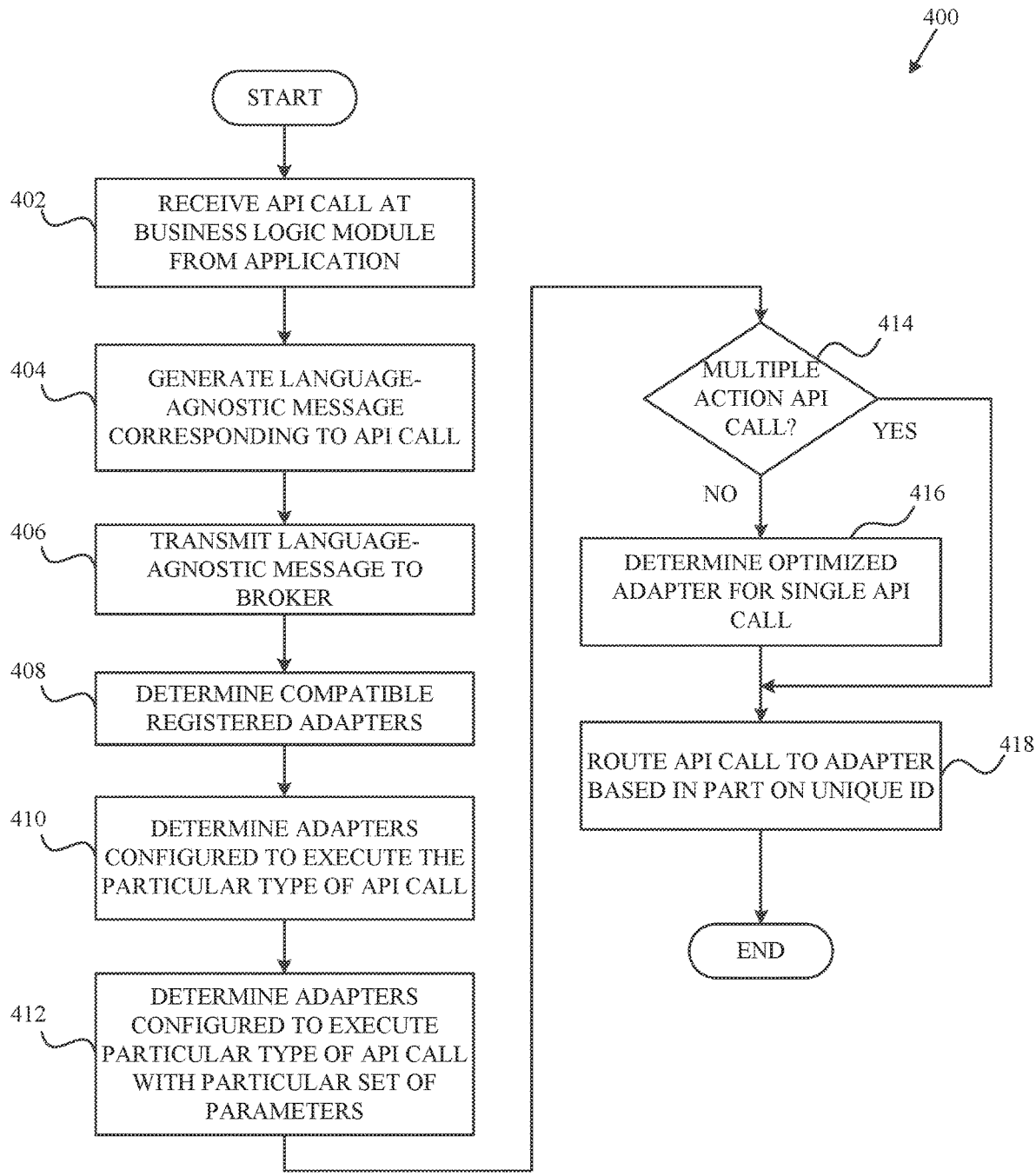
FIG. 4 is an exemplary API routing process, according to one aspect of the present disclosure.

Looking now at FIG. 4, a flowchart illustrating the exemplary API routing process 400 is shown, according to one aspect of the present disclosure. In one embodiment, the API routing process 400 is capable of being performed after completion of the exemplary federated API generation process 300. According to various aspects of the present disclosure, the API routing process 400 includes receiving API calls from the one or more applications 104 and, via the federated API and instantiated entities 114, determine which adapter 122 is to receive the API call for further transmitting the API call to the one or more components 106.

In one embodiment, at step 402 the exemplary API routing process begins when an API call is received at the business logic module 120 from at least one of the one or more applications 104. In various embodiments, the API call received at the business logic module 120 may be formatted according to the transmitting application 104 and/or the destination component 106. In certain embodiments, examples of API calls being received at the business logic module 120 may include API calls from applications such as Twitter to retrieve data relating to trending social media topics, or a particular SaaS application retrieving analytic data from a remote server, etc.

Proceeding now to step 404, the business logic module 120 may generate a language-agnostic message corresponding to the received API call. As described previously in the discussion of FIG. 3, the federated API communicated within the system 100 is language-agnostic, similar to JSON, and encompasses the functionality of each unique API call received from the one or more applications 104 or the one or more components 106. According to various aspects of the present disclosure, generating a language-agnostic message corresponding to the API call allows for the system 100 to communicate the API call within the API integration module 102 using the federated API (e.g., indicating the action the API call is requesting, and its corresponding entity 114).

At step 406, the language-agnostic message (e.g., the federated API call) is transmitted to the broker layer 110 included within the API integration module 102. As described above in the discussion of FIG. 1, the broker layer 110 is a software layer configured to manage one or more instantiated entities 114 and further to route API calls to the appropriate adapters 122. In various embodiments, in response to receiving the federated API call at the broker layer 110, the broker layer 110 further executes and processes a series of instructions to determine the optimal adapter 122 to which the federated API call should be routed.

In one embodiment, at step 408, the broker layer 110 may determine or identify the registered adapters 122 that are compatible to accept the federated API call. For example, the federated API call may include a request to retrieve particular data from a database. According to various aspects of the present disclosure, the one or more adapters 122 associated with the one or more components 106 that allow for retrieval of data from a database may be determined to be compatible with the federated API call. However, according to various aspects of the present disclosure, each compatible adapter 122 may not be configured to execute the particular type of API call, as will be explained in greater detail below.

Step 410 includes determining the adapters 122 configured to execute the particular type of API call, according to one embodiment. For example, consider that adapter 122A and adapter 122B are both mapped to receive API calls from a "router" entity 114. In various embodiments, a router API call directed to the router entity 114 may potentially be routed to the adapter 122A, the router 122B, or both. However, the router API call may include particular parameters that may determine which adapter 122 receives the API call, as will be discussed immediately below.

In various embodiments, at step 412 the broker layer 110 determines the adapters that are configured to execute the particular type of API call with the particular set of parameters. Continuing with the example above, consider that the adapter 122A is configured to receive API calls regarding router inventory data (e.g., interfaces, ports, cards, etc.) and the adapter 122B is configured to receive API calls regarding telemetry data. According to various aspects of the present disclosure, a the broker layer 110 may determine that an API call querying available interfaces is to be routed to the adapter 122A, and an API call querying telemetry data is to be routed to the adapter 122B, despite both adapters 122 generally being operable to receive "router" API calls. In particular embodiments, this parameter-based API call routing allows for one entity 114 to map to a plurality of adapters 122 and to further route API calls to the appropriate adapters 122 based on the parameters included in the API call.

Proceeding now to step 414, the broker layer 110 determines if the federated API call represents a multiple action API call, according to one embodiment. In various embodiments, a multiple action API call may include instructions that cannot be executed in a single instruction cycle, and may require additional resources or more computing requirements than a single action API call. In response to determining that the federated API call does not represent a multiple action API call, the process may proceed to step 416 and the broker layer 110 determines the optimized adapter 122 for the single API call. If it is determined that the federated API call does represent a multiple action API call, the process may proceed directly to step 418. In one embodiment, step 418 includes the ultimate routing of the federated API call to the optimal adapter based in part on a unique ID included in the adapter router 124 mapping.

Figure 5:
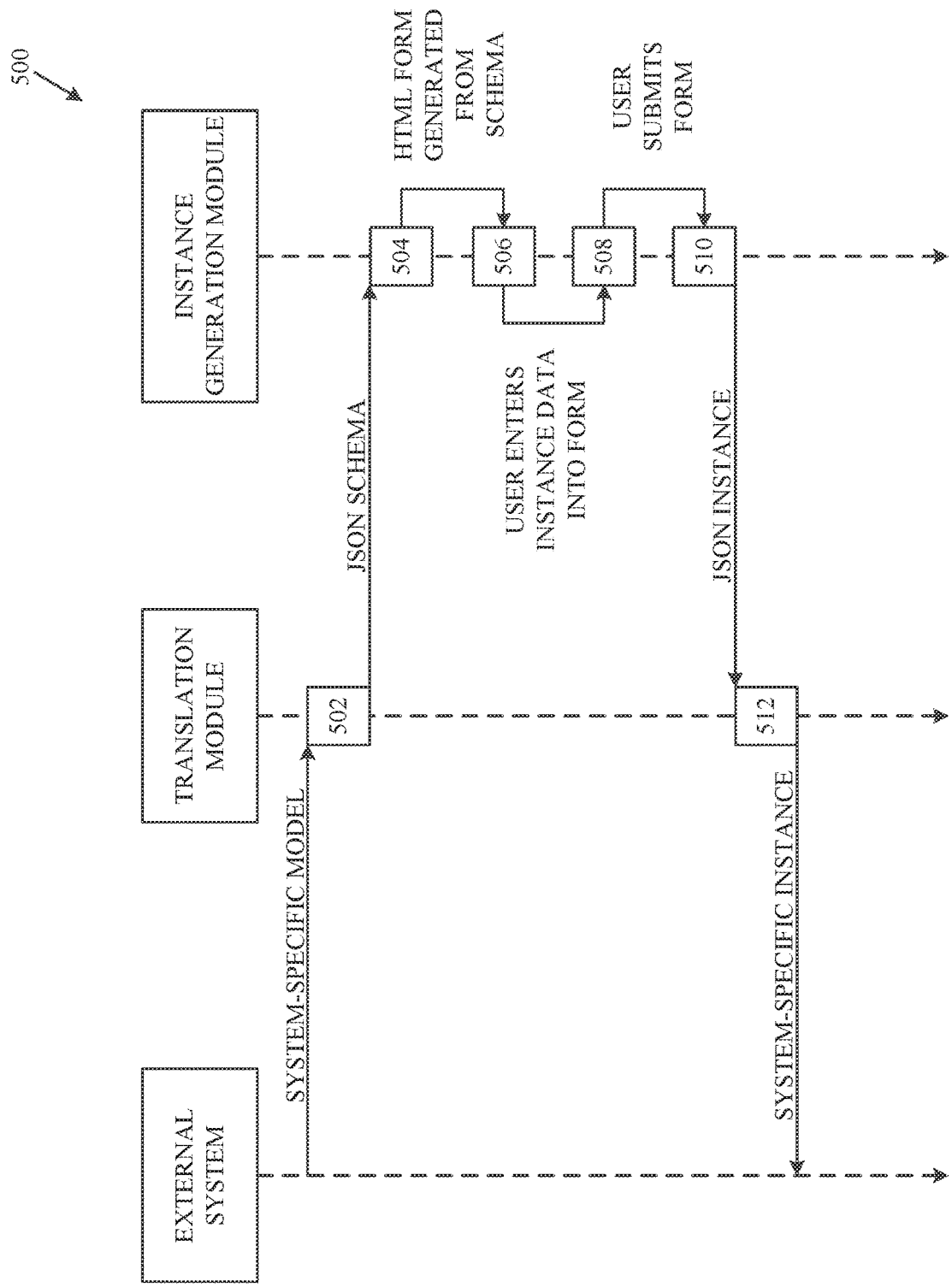
FIG. 5 a sequence diagram of exemplary system operations, according to one aspect of the present disclosure.

Proceeding now to FIG. 5, a sequence diagram 500 shows one embodiment of exemplary system operations. As discussed above with respect to FIGS. 1-4, embodiments of the system described herein generally consume API function calls and generate a federated API call for more efficiently mapping the consumed API function call to a target destination (e.g., a network component). As described in the following discussion associated with FIGS. 5-7, the system may further translate data models received from various systems into a format that retains the information of the data model but also allows for the system to manipulate the information. For example, the system may translate a data model received from a network server into a different form to allow for a system user to select particular bandwidth settings or options, which may then be translated back into a specific format receivable by the server. Accordingly, the system allows for network information received in traditionally unworkable formats to be translated into a workable format, manipulated, and then re-translated into a format that is compatible with the network component from which it was received.

The embodiment shown in FIG. 5 is a sequence diagram 500 illustrating a general operational implementation of the exemplary system. In the present embodiment, the sequence diagram begins when a system-specific model is received at a translation module from an external system. As will be discussed in greater detail below in association with FIGS. 6-7, the external system may include various network components such as servers, switches, and general network orchestrators; however, in various embodiments, the external systems may also include cloud-based components and cloud orchestrators.

In one embodiment, the system-specific model includes network information in a format native to the particular network component from which it was generated or transmitted. For example, a server associated with the external system may generate and transmit outward data packages in any appropriate modeling language (e.g., YANG, TOSCA, NEMO, etc.). In various embodiments, and indicated at the sequence diagram event 502, the system-specific model may be transformed or modified at the translation module, where the translation module may then parse, interpret, and extract the system-specific data model syntax for determining the relevant information from the data package. In certain embodiments, the system-specific data model may include terms such as "<network-instance>," "<name>," "<edit-config>," "<protocol>," etc., each of which the system may identify via parsing the data model (e.g., via a text parser, or the like, configured to identify a set of predetermined terms), and the system may furthermore identify any relevant data or text associated with the identified terms. For example, the system may identify the term "<name>" and furthermore identify a label or known identifier corresponding to the component of the external system from which the payload was received. In other embodiments, relevant information identified within the payloads may include commands for transmitting electronic data between servers, certain protocols to use (or being used) for transmitting data, target network components intended for receiving the payload, etc. In particular embodiments, the data model payload may include diagnostic information relating to the external system's network component from which it was received. For example, the data model may include bandwidth, throughput, and general network traffic information corresponding to the external system network component.

Continuing with FIG. 5, and referring to the sequence diagram event 502, the system, via the translation module, may translate the system-specific model into a human-readable format (or schema) such as JSON or the like. In a particular embodiment, translating the system-specific model into a JSON schema allows for a user to easily understand the context of the system-specific model, and also allows for the user to easily manipulate or augment the context from the system-specific model. Accordingly, at the sequence diagram events 504-508, the system allows for a user to provide parameters, via an instance generation module, for manipulating the network components from which the system-specific model was received, or for generating a new network component (to be described in greater detail below).

In one embodiment, the sequence diagram event 504 includes generating, at an instance generation module, a HTML form (or any other appropriate format) from the JSON schema received from the translation module. In some embodiments, the HTML form may be presented as a GUI, or the HTML form may be plain text accessible in a web-browser or text editor. According to various aspects of the present disclosure, particular fields of the JSON schema (e.g., a "bandwidth" field) are mapped to particular text fields of the HTML form for allowing a user to provide desired parameters for the corresponding system-specific data represented in the JSON schema. For example, if the JSON schema included a bandwidth parameter, this data may be mapped to the HTML form such that the bandwidth reading is shown in a text field, and the text field may be adjustable via entering new keystrokes, adjusting GUI slide-bars (e.g., sliding a meter to the right to increase the bandwidth), increasing or decreasing the bandwidth in predetermined increments (e.g., 0.5 MBps) via selecting up or down arrows, etc.

In various embodiments, at the sequence diagram event 506, the user enters the instance data into the form, (e.g., via engaging with the GUI, changing the HTML text, etc.) and at the sequence diagram event 508 the user submits the form. In a particular embodiment, submitting the form may include indicating if the form data is to be used for manipulating the external system network component from which the data model was received, or for instantiating an entirely new network component. In certain embodiments, and at the sequence diagram event 510, the instance generation module compiles the modified JSON schema data into a JSON instance and transmits the JSON instance to the translation module.

In one embodiment, at the sequence diagram event 512, the translation module accepts the JSON instance as an input and outputs the data included in the JSON instance (e.g., data from the HTML form, as modified by a user) as a system-specific instance in accordance with the system-specific model. In certain embodiments, the system-specific instance may correspond directly to the system-specific model, or the system-specific instance may be translated into another format compatible with the external system network component from which the system-specific model was received. Furthermore, the translation module may transmit the system-specific instance to the external system for manipulating one or more network components associated with the external system, creating a new network component (e.g., a virtual computing instance) with the parameters defined by the HTML form, facilitating a data transmission from the external system to a separate network component or system, etc.

Figure 6:
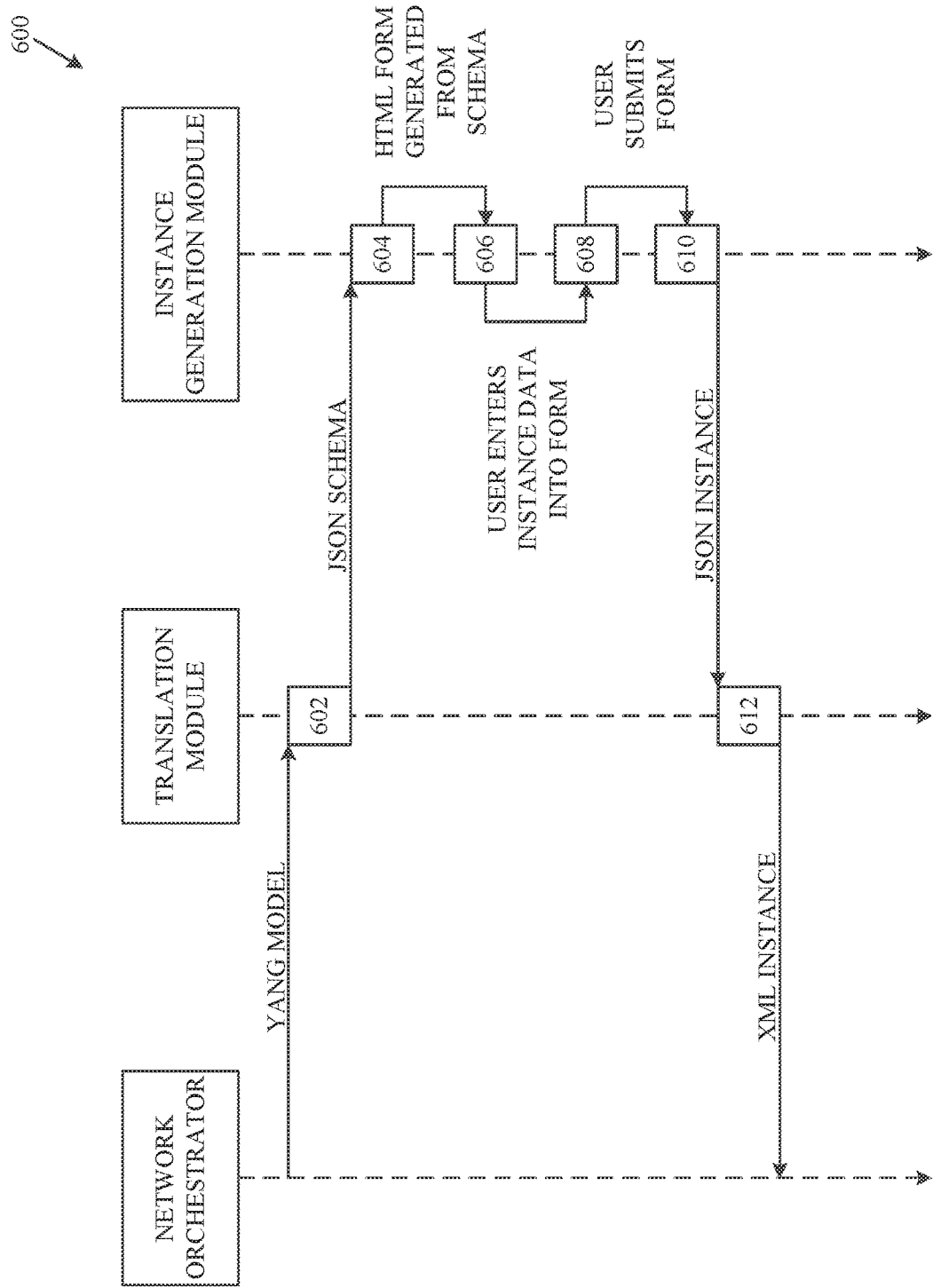
FIG. 6 a sequence diagram of exemplary system operations, according to one aspect of the present disclosure.

Turning now to FIG. 6, a sequence diagram 600 illustrating a YANG-specific operational implementation of the exemplary system is shown in a particular embodiment. In the present embodiment, the sequence diagram begins when a YANG model is received at a translation module from a network orchestrator (or a particular network component associated with the network orchestrator). According to various aspects of the present disclosure, a network orchestrator is generally a system including a plurality of hardware components, such as servers, switches, etc., as well as software configured to streamline and facilitate services across disparate systems through the servers and switches. According to various aspects of the present disclosure, the system discussed herein may be considered a network orchestrator, in various embodiments.

In one embodiment, the YANG model may include network information defined according to the YANG modeling language. One of ordinary skill in the art will recognize that YANG is a powerful and robust modeling language used for communicating network state and configuration data according to the NETCONF protocol. In various embodiments, and indicated at the sequence diagram event 602, the YANG model may be transformed or modified at the translation module, where the translation module may then parse, interpret, and extract the YANG model syntax for determining the relevant information from the data package. In certain embodiments, the YANG data model may include terms such as "<network-instance>," "<name>," "<edit-config>," "<protocol>," etc., each of which the system may identify via parsing the data model (e.g., via a text parser, or the like, configured to identify a set of predetermined terms), and the system may furthermore identify any relevant data or text associated with the identified terms. For example, the system may identify the term "<name>" and furthermore identify a label or known identifier corresponding to the component of the network orchestrator from which the payload was received. In other embodiments, relevant information identified within the payloads may include commands for transmitting electronic data between servers, certain protocols to use (or being used) for transmitting data, target network components intended for receiving the payload, etc. In particular embodiments, the YANG model may include diagnostic information relating to the network orchestrator's component from which it was received. For example, the YANG model may include bandwidth, throughput, latency, packet loss, and general network traffic information corresponding to the network orchestrator.

Continuing with FIG. 6, and referring to the sequence diagram event 602, the system, via the translation module, may translate the YANG model into a human-readable format (or schema) such as JSON or the like. In a particular embodiment, translating the YANG model into a JSON schema allows for a user to easily understand the context of the YANG model, and also allows for the user to easily manipulate or augment the context from the YANG model. Accordingly, at the sequence diagram events 604-608, the system allows for a user to provide parameters, via an instance generation module, for manipulating the network components associated with the network orchestrator, or for generating a new network component (to be described in greater detail below).

In one embodiment, the sequence diagram event 604 includes generating, at an instance generation module, a HTML form (or any other appropriate format) from the JSON schema received from the translation module. In some embodiments, the HTML form may be presented as a GUI, or the HTML form may be plain text. According to various aspects of the present disclosure, particular fields of the JSON schema (e.g., a "bandwidth" field) are mapped to particular text fields of the HTML form for allowing a user to provide desired parameters for the corresponding YANG data represented in the JSON schema. For example, if the JSON schema included a bandwidth parameter, this data may be mapped to the HTML form such that the bandwidth reading is shown in a text field, and the text field may be adjustable via entering new keystrokes, adjusting GUI slide-bars (e.g., sliding a meter to the right to increase the bandwidth), increasing or decreasing the bandwidth in predetermined increments (e.g., 0.5 MBps) via selecting up or down arrows, etc.

In various embodiments, at the sequence diagram event 606, the user enters the instance data into the form, (e.g., via engaging with the GUI, changing the HTML text, etc.) and at the sequence diagram event 608 the user submits the form. In a particular embodiment, submitting the form may include indicating if the form data is to be used for manipulating various components associated with the network orchestrator, or for instantiating an entirely new network component. In certain embodiments, and at the sequence diagram event 610, the instance generation module compiles the modified JSON schema data into a JSON instance and transmits the JSON instance to the translation module.

In one embodiment, at the sequence diagram event 612, the translation module accepts the JSON instance as an input and outputs the data included in the JSON instance (e.g., data from the HTML form, as modified by a user) as an XML instance in accordance with the YANG model. In a particular embodiment, the XML instance need not be translated to YANG, as YANG represents data in an XML tree format, and thus is a compatible format for the network orchestrator. In certain embodiments, the XML instance may correspond directly to the YANG model, or the XML instance may be translated into another format compatible with the network orchestrator. Furthermore, the translation module may transmit the XML instance to the network orchestrator for manipulating one or more network components associated with the network orchestrator, creating a new network component (e.g., a virtual computing instance) with the parameters defined by the HTML form, facilitating a data transmission from the network orchestrator to a separate network component or system, etc.

Figure 7:
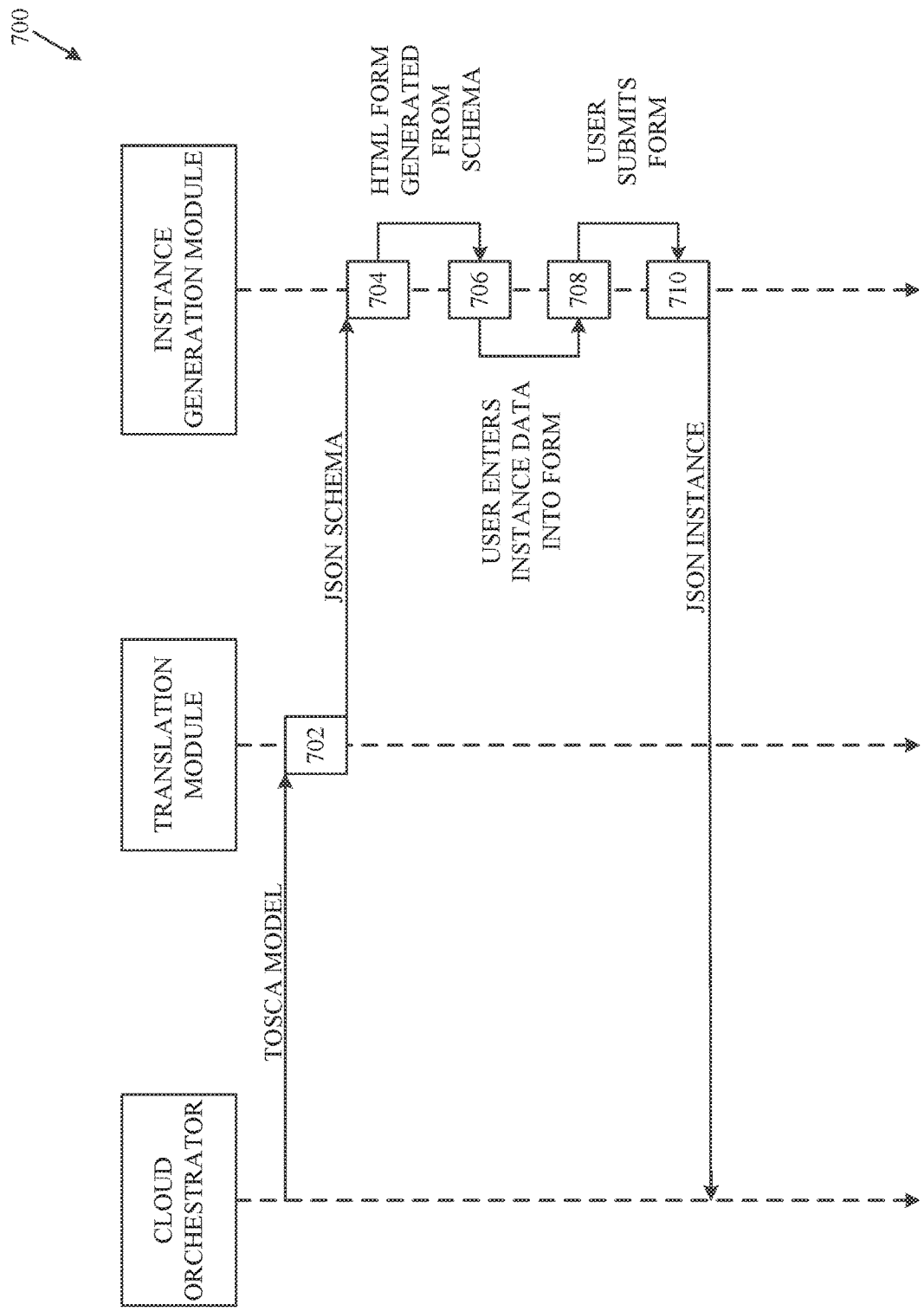
FIG. 7 a sequence diagram of exemplary system operations, according to one aspect of the present disclosure.

Proceeding to FIG. 7, a sequence diagram 700 illustrating a TOSCA-specific operational implementation of the exemplary system is shown in a particular embodiment. In the present embodiment, the sequence diagram begins when a TOSCA model is received at a translation module from a cloud orchestrator (or a particular component or web resource associated with the cloud orchestrator). According to various aspects of the present disclosure, a cloud orchestrator is similar to a network orchestrator, however, a cloud orchestrator manages system network interconnections through cloud-based infrastructures).

In one embodiment, the TOSCA model may include network information defined according to the TOSCA modeling language. One of ordinary skill in the art will recognize that TOSCA is a powerful and robust modeling language used for communicating network state and configuration data according to the NETCONF protocol. In various embodiments, and indicated at the sequence diagram event 702, the TOSCA model may be transformed or modified at the translation module, where the translation module may then parse, interpret, and extract the TOSCA model syntax for determining the relevant information from the data package. In certain embodiments, the TOSCA data model may include terms such as "node_types," "topology_template," etc., each of which the system may identify via parsing the data model (e.g., via a text parser, or the like, configured to identify a set of predetermined terms), and the system may furthermore identify any relevant data or text associated with the identified terms. For example, the system may identify the term "node_types" and furthermore identify a label or known identifier corresponding to the component or node of the cloud orchestrator from which the payload was received. In other embodiments, relevant information identified within the payloads may include commands for transmitting electronic data between servers, certain protocols to use (or being used) for transmitting data, target network components or nodes intended for receiving the payload, etc. In particular embodiments, the TOSCA model may include diagnostic information relating to the cloud orchestrator's component from which it was received. For example, the TOSCA model may include bandwidth, throughput, latency, packet loss, and general network traffic information corresponding to the cloud orchestrator.

Continuing with FIG. 7, and referring to the sequence diagram event 702, the system, via the translation module, may translate the TOSCA model into a human-readable format (or schema) such as JSON or the like. In a particular embodiment, translating the TOSCA model into a JSON schema allows for a user to easily understand the context of the TOSCA model, and also allows for the user to easily manipulate or augment the context from the TOSCA model. Accordingly, at the sequence diagram events 704-708, the system allows for a user to provide parameters, via an instance generation module, for manipulating the network components associated with the cloud orchestrator, or for generating a new network component (to be described in greater detail below).

In one embodiment, the sequence diagram event 704 includes generating, at an instance generation module, a HTML form (or any other appropriate format) from the JSON schema received from the translation module. In some embodiments, the HTML form may be presented as a GUI, or the HTML form may be plain text. According to various aspects of the present disclosure, particular fields of the JSON schema (e.g., a "bandwidth" field) are mapped to particular text fields of the HTML form for allowing a user to provide desired parameters for the corresponding TOSCA data represented in the JSON schema. For example, if the JSON schema included a bandwidth parameter, this data may be mapped to the HTML form such that the bandwidth reading is shown in a text field, and the text field may be adjustable via entering new keystrokes, adjusting GUI slidebars (e.g., sliding a meter to the right to increase the bandwidth), increasing or decreasing the bandwidth in predetermined increments (e.g., 0.5 MBps) via selecting up or down arrows, etc.

In various embodiments, at the sequence diagram event 706, the user enters the instance data into the form, (e.g., via engaging with the GUI, changing the HTML text, etc.) and at the sequence diagram event 708 the user submits the form. In a particular embodiment, submitting the form may include indicating if the form data is to be used for manipulating various components associated with the cloud orchestrator, or for instantiating an entirely new cloud component. In certain embodiments, and at the sequence diagram event 710, the instance generation module compiles the modified JSON schema data into a JSON instance and transmits the JSON instance directly back to the cloud orchestrator—bypassing the translation module.

In certain embodiments, the JSON may be transmitted directly to the cloud orchestrator, without needing further translation, as the cloud orchestrator may accept JSON data instances as compatible message formats. In one embodiment, the translation module may transmit the JSON instance to the cloud orchestrator for manipulating one or more components, resources, or services associated with the cloud orchestrator, creating a new cloud component (e.g., a virtual computing instance) with the parameters defined by the HTML form, facilitating a data transmission from the cloud orchestrator to a separate network component or system, etc.

As discussed above, in particular embodiments, the system may receive data objects formatted according to various modeling languages, translate the received data objects into a form different than the received model format, modify the translated data object (e.g., adjust or add parameters), and finally translate the data object back into the original model format (or a format compatible with the system from which the model was originally received). As will be appreciated by one of ordinary skill in the art, the systems and methods discussed herein allow for the translation and manipulation of data models, which otherwise generally does not exist in the realm of computer networks. In certain embodiments, the below discussion in association with FIGS. 8 and 9 illustrate additional aspects of the model translation process occurring at the translation module and the instance generation module, respectively.

Figure 8:
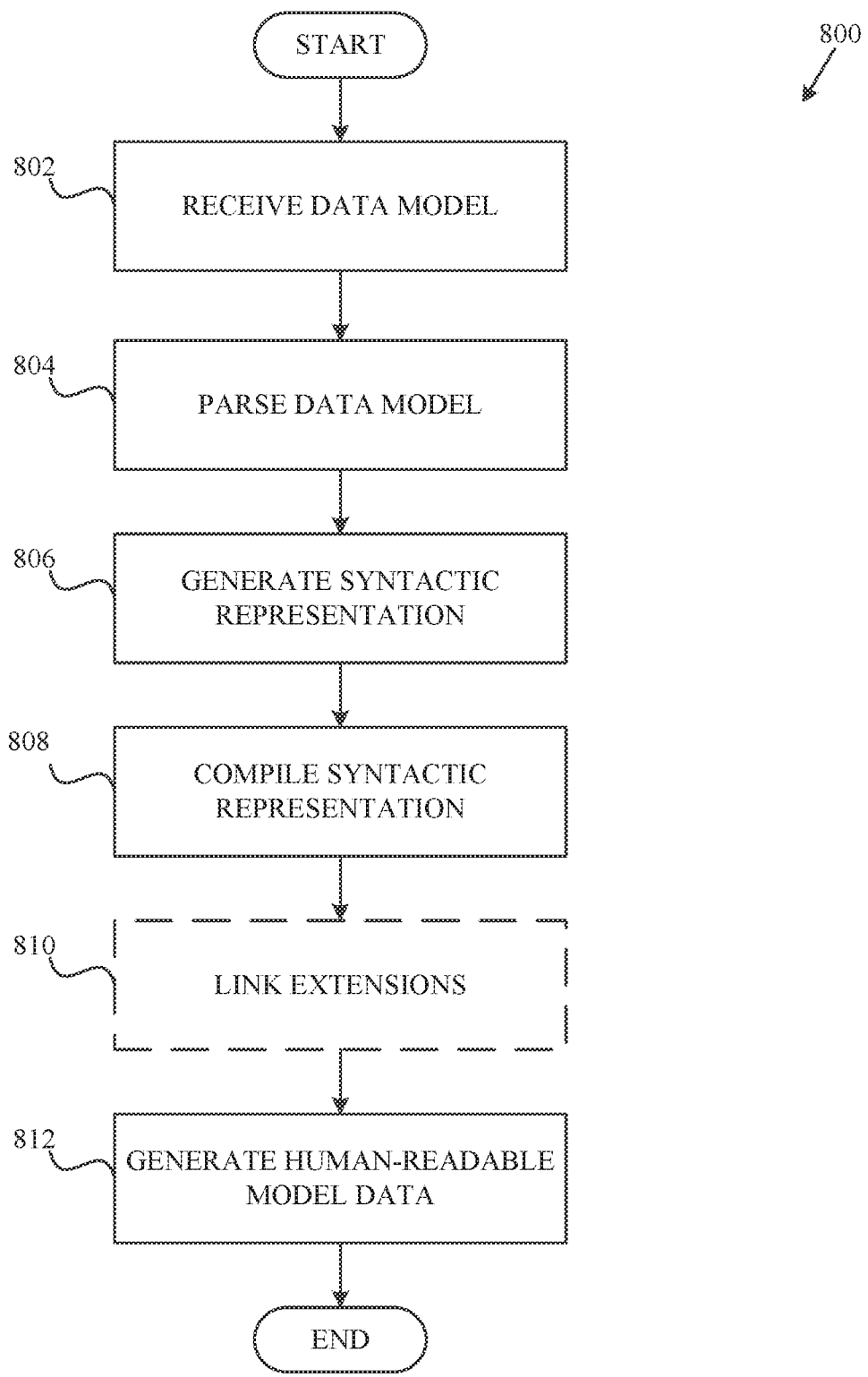
FIG. 8 is a an exemplary model conversion process, according to one aspect of the present disclosure.
Figure 9:
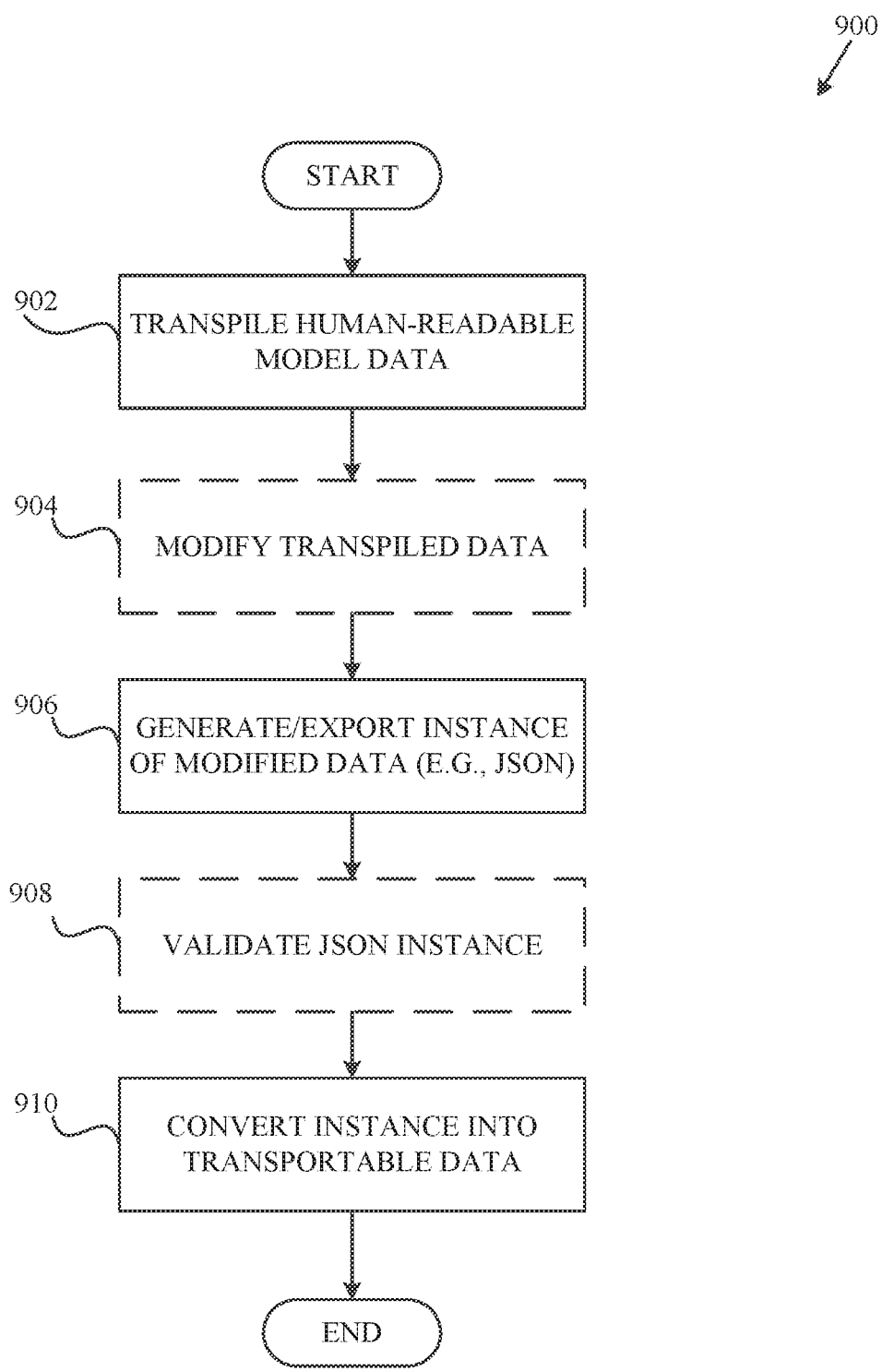
FIG. 9 is an exemplary instance builder process, according to one aspect of the present disclosure.

Turning now to FIG. 8, a flowchart illustrating an exemplary model conversion process 800 is shown, according to one aspect of the present disclosure. In particular embodiments, the model conversion process 800 is a process by which the system 100 may convert a data model representation of a physical (or virtual) network component (e.g., a YANG text file representative of a network component state) into a language-agnostic and human readable format (e.g., such as JSON or modified JSON), which may allow for system users to better understand the state of the network components and also later modify instances of the network components via the human readable format. In various embodiments, the process 800 allows for the information included in a generally "unworkable" text file, such as a YANG data model, to be converted into a human-readable data format that is "workable" within the system.

In one embodiment, the process 800 begins at step 802, where the system receives a data model representative of at least one of the network components 106. According to various aspects of the present disclosure, an application 104 may receive the data model in response to querying a particular network component 106 with a request, such as a "get-config" request. In various embodiments, the received data model may be represented in the YANG modeling language, and the data model may include modeled details and parameters corresponding to the particular network component 106. For example, a YANG data model received at step 802 may include parameters such as (but not limited to) bandwidth measurements, latency measurements, packet loss measurements, etc., and other related outlining the state and structure of the network component.

In various embodiments, at step 804, the system parses the received data model for determining the context of the data model. For example, the data model may be represented as a text file, and parsing the data model may include identifying delimiters or syntax to determine the meaning of the data model. Furthermore, a YANG data model may include the text "model," which, when parsed by the system, may be interpreted as the beginning of the YANG model and the text immediately thereafter may identify the modeled network component. According to various aspects of the present disclosure, the ability to parse a YANG model, or any other appropriate modeling language, may be a proprietary tool configured specifically for the disclosed system (such as the parse operator 128), or the tool may be a third-party resource.

Proceeding now to step 806, and in response to parsing the data model at step 804, the system may generate a syntactic representation of the parsed data, according to one embodiment. In various embodiments, the syntactic representation of the parsed data may be an abstract syntax tree ("AST"), or the like. One of ordinary skill in the art will appreciate that an AST allows for data that may initially lack structure or meaning to be transformed in such a way that allows for a computing device to compile the data for further processing. Accordingly, an AST organizes the programmable syntax of data in a hierarchical fashion, which in turn simplifies the compiling process of the data.

At step 808, according to one aspect of the present disclosure, the system compiles the syntactic representation of the parsed data. According to various aspects of the present disclosure, at step 808 the system compiles the syntactic representation of the parsed data into an alternative JSON/XML-based syntax. One of ordinary skill in the art will understand and be familiar with the ability to translate YANG modules (and other modeling languages) into an XML-based syntax called YIN (as described in the IETF publication RFC 7950). Accordingly, the YANG and YIN formats may include substantially similar or equivalent data, however, the data is represented differently in each format. Furthermore, the YIN notation allows for users to represent YANG data models in an XML format, which thereby allows for the users to leverage XML-based tools for data filtering, validation, automated generation of code, etc. According to various aspects of the present disclosure, the schema discussed here maps a language-agnostic file format, such as JSON, to include the data from step 806 in an XML-based format. For example, each node in an AST generated at step 806 may include a construct occurring in the received data model that may be translated into a JSON and XML-based syntax.

In some embodiments, the model conversion process 800 may proceed to the optional step 810 for establishing links within the compiled syntax. For example, the data model received at step 802 may reference other data models, or may import/include libraries or the like. In various embodiments, the system may compile the syntactic representation of the data model at step 808 without the import/include references attached, and then link the extensions to the compiled data afterwards at step 810 (after the syntactic representation of the parsed data is already compiled). In certain embodiments, linking the imported or included libraries after compiling improves the ease of compilation and the overall performance of the system 100.

In response to compiling the syntax at step 808 (and optionally linking the compiled data at step 810), the system may generate a human-readable data format (such as a JSON schema) at step 812. According to various aspects of the present disclosure, the schema data generated at step 812 is a lossless representation of the YANG data model received at step 802, however, the data model has been converted into a format that is human readable (e.g., JSON or modified JSON) and can be used to modify the particular instances of network components 106 corresponding to the received YANG data model. Accordingly, the exemplary model conversion process 800 allows for a data model, such as a YANG data model representative of a network component, to be parsed and compiled into a JSON/XML-like hybrid, and furthermore "recompiled" at step 812 to generate a JSON or JSON-like data object. In certain embodiments, the data at step 812 is "recompiled" by mapping the syntax of the JSON/XML-like hybrid from step 808 into a purely JSON compatible structure.

Turning now to FIG. 9, a flowchart illustrating an exemplary instance builder process 900 is shown, according to one aspect of the present disclosure. According to various embodiments, the instance builder process 900 allows for the system 100 to generate a form which includes model data corresponding to the network component 106 modeled by the data received at the step 802 in the exemplary model conversion process 800. In one embodiment, the form data is generated at step 902 by transpiling the human-readable data format (e.g., JSON schema) from step 812 into structured format (e.g., HTML) which may be displayed to a user. In certain embodiments, the instance builder process 900 includes an optional step 904 where the user may modify or configure the transpiled data. In particular embodiments, at this optional step 904, the system may display to the user certain parameters included in the data model received at step 802 from the process 800; however, the form data may allow for the user to change the parameters (for example, increasing or decreasing bandwidth settings, etc.). In this way, a user of the system 100 may interact with the network components 106 included in the system 100 via a form or template generated based on and populated with data from a manipulated data model.

Proceeding now to step 906, according to one embodiment, the system may generate or export an instance of the transpiled and/or modified form data as a JSON instance. One of ordinary skill in the art will understand that JSON is a human-readable object notation language for representing data in human-readable text format. Accordingly, the simplicity and versatility of JSON makes it desirable for representing data to be interpreted by not only machines but also humans.

In particular embodiments, the system may optionally validate the JSON instance at step 908. According to various aspects of the present disclosure, validating the JSON instance may include cross-referencing the JSON instance to a known representation of the substantially similar model data within the system. In certain embodiments, a validate operator 132 may execute the validation, where the validate operator 132 may scan the JSON instance contents and compare the scanned contents to known model data.

In one embodiment, after the JSON instance is generated at step 906 and optionally validated at step 908, the system may convert the JSON instance data into XML format (the transport language for NETCONF) and the XML format may be readable to the network components 106 as an XML payload. In particular embodiments, the data converted into XML format at step 910 may update or reconfigure the network component 106 corresponding to the data model received at step 802 of the process 800. In certain embodiments, the data converted into XML at step 910 may be representative of an entirely new network component.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A computer-implemented method for translating network component model data, the method comprising the steps of:
   receiving model data from a particular network component associated with an external system, wherein the model data comprises a particular data modeling language format defined by the particular network component, and wherein the model data comprises a plurality of parameters relating to the particular network component;
   identifying within the plurality of parameters of the model data one or more syntactic terms from a set of predetermined terms, and further identifying term values corresponding to each of the one or more syntactic terms, wherein the one or more syntactic terms and term values correspond to the particular data modeling language format and the particular network component;
   generating a language-agnostic data object comprising a JSON schema representation corresponding to the model data, wherein the JSON schema representation comprises the one or more syntactic terms;
   generating a web-based form based on the language-agnostic data object, wherein the web-based form comprises text fields corresponding to the one or more syntactic terms;
   receiving instance parameters based on user-provided input in the form;
   generating a JSON data object instance comprising the JSON schema representation compiled with the instance parameters;
   generating a data payload based on the JSON data object comprising the instance parameters, wherein the data payload is compiled in a format based on the particular data modeling language format corresponding to the model data; and
   transmitting the data payload to the particular network component.

2. The computer-implemented method of claim 1, wherein the external system comprises a plurality of servers, modems, and switches.

3. The computer-implemented method of claim 2, wherein the model data comprises data formatted according to the JSON modeling language.

4. The computer-implemented method of claim 1, wherein the external system comprises a network orchestrator.

5. The computer-implemented method of claim 4, wherein the model data comprises data formatted according to the YANG modeling language.

6. The computer-implemented method of claim 1, wherein the external system comprises a cloud orchestrator.

7. The computer-implemented method of claim 6, wherein the model data comprises data formatted according to the TOSCA modeling language.

8. The computer-implemented method of claim 1, wherein the model data is originally directed to a particular network application operable to execute instructions received in the particular data modeling language format.

9. The computer-implemented method of claim 1, wherein the plurality of parameters corresponding to the particular network component comprises a component identifier, a bandwidth reading, a throughput reading, a data packet loss reading, and/or a latency reading.

10. The computer-implemented method of claim 1, wherein identifying the one or more syntactic terms and the term values comprises:
    parsing the model data to identify the one or more syntactic terms from the set of predetermined terms indicative of the plurality of parameters corresponding to the particular network component; and
    extracting the one or more syntactic terms and the term values, wherein the one or more syntactic terms and term values are mapped to the language-agnostic data object comprising the JSON schema representation corresponding to the model data based on a particular mapping policy.

11. The computer-implemented method of claim 1, wherein the web-based form is an HTML, form, and wherein a user provides the instance parameters via a GUI representation of the HTML form or a text representation of the HTML form.

12. A system for translating network component model data, comprising:
    a processor operatively connected to a plurality of network components and network applications, wherein the processor is configured to facilitate electronic communications between the network components and the network applications by executing the steps comprising:
    receiving model data from a particular network component associated with an external system, wherein the model data comprises a particular data modeling language format defined by the particular network component, and wherein the model data comprises a plurality of parameters relating to the particular network component;
    identifying within the plurality of parameters of the model data one or more syntactic terms from a set of predetermined terms, and further identifying term values corresponding to each of the one or more syntactic terms, wherein the one or more syntactic terms and term values correspond to the particular data modeling language format and the particular network component;
    generating a language-agnostic data object comprising a JSON schema representation corresponding to the model data, wherein the JSON schema representation comprises the one or more syntactic terms;
    generating a web-based form based on the language-agnostic data object, wherein the web-based form comprises text fields corresponding to the one or more syntactic terms;

receiving instance parameters based on user-provided input in the form;

generating a JSON data object instance comprising the JSON schema representation compiled with the instance parameters;

generating a data payload based on the JSON data object comprising the instance parameters, wherein the data payload is compiled in a format based on the particular data modeling language format corresponding to the model data; and transmitting the data payload to the particular network component.

13. The system of claim 12, wherein the external system comprises a plurality of servers, modems, and switches.

14. The system of claim 13, wherein the model data comprises data formatted according to the JSON modeling language.

15. The system of claim 12, wherein the external system comprises a network orchestrator.

16. The system of claim 15, wherein the model data comprises data formatted according to the YANG modeling language.

17. The system of claim 12, wherein the external system comprises a cloud orchestrator.

18. The system of claim 17, wherein the model data comprises data formatted according to the TOSCA modeling language.

19. The system of claim 12, wherein the model data is originally directed to a particular network application operable to execute instructions received in the particular data modeling language format.

20. The system of claim 12, wherein the plurality of parameters corresponding to the particular network component comprises a component identifier, a bandwidth reading, a throughput reading, a data packet loss reading, and/or a latency reading.

21. The system of claim 12, wherein identifying the one or more syntactic terms and the term values comprises:

parsing the model data to identify the one or more syntactic terms from the set of predetermined terms indicative of the plurality of parameters corresponding to the particular network component; and extracting the one or more syntactic terms and the term values, wherein the one or more syntactic terms and term values are mapped to the language-agnostic data object comprising the JSON schema representation corresponding to the model data based on a particular mapping policy.

22. The system of claim 12, wherein the web-based form is an HTML form, and wherein a user provides the instance parameters via a GUI representation of the HTML form or a text representation of the HTML form.

* * * * *